May 24, 1960
J. R. SKINNER ET AL
2,938,040
EPOXIDATION OF UNSATURATED ALDEHYDES
Filed Sept. 9, 1957
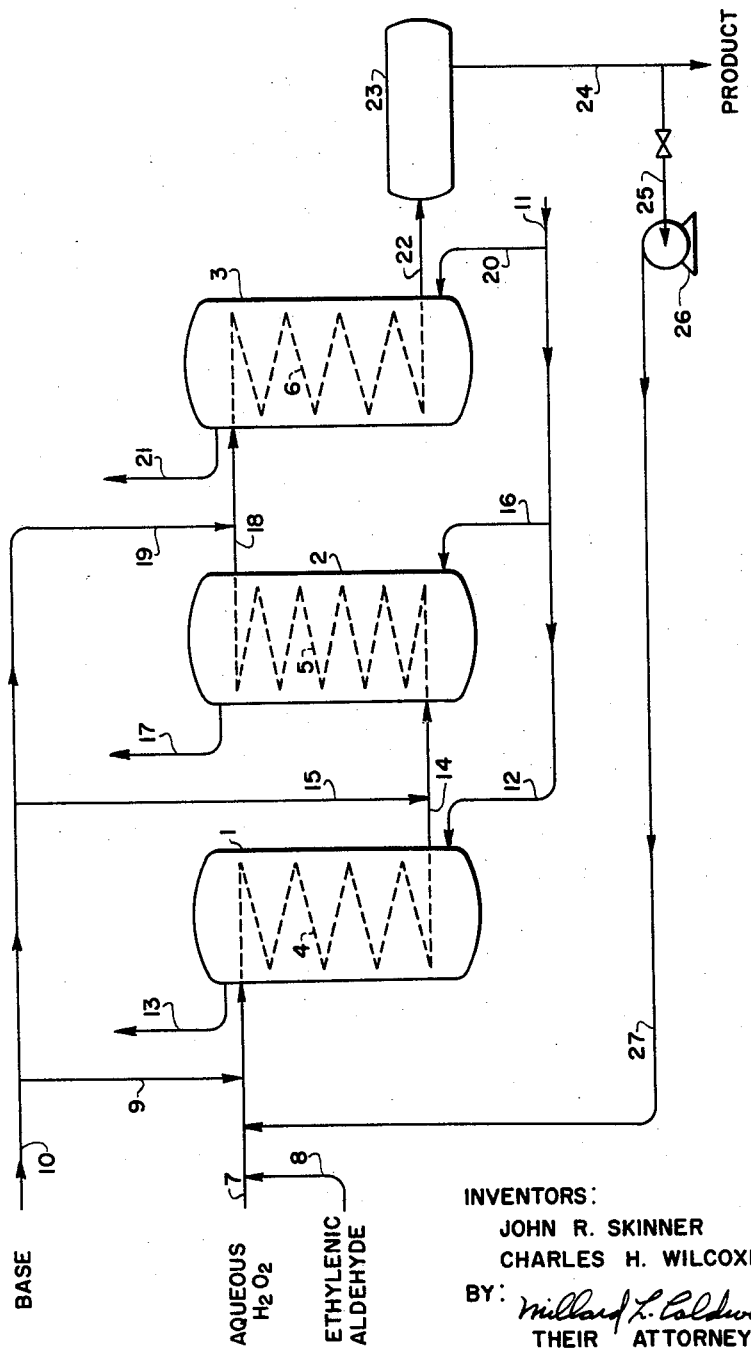
INVENTORS:
JOHN R. SKINNER
CHARLES H. WILCOXEN JR.
BY: Millard L. Caldwell
THEIR ATTORNEY

# United States Patent Office 2,938,040
Patented May 24, 1960

2,938,040

EPOXIDATION OF UNSATURATED ALDEHYDES

John R. Skinner, Oakland, and Charles H. Wilcoxen, Jr., San Lorenzo, Calif., assignors to Shell Oil Company, a corporation of Delaware Filed Sept. 9, 1957, Ser. No. 682,969

10 Claims. (Cl. 260—348.5)

This invention relates to the production of epoxyaldehydes by reacting the corresponding alpha,beta-ethylenic aldehydes with alkaline hydrogen peroxides. It deals with an improved process for carrying out this reaction efficiently and economically on a practical commercial scale.

It is known that alpha,beta-ethylenic aldehydes can be epoxidized by reaction with hydrogen peroxide in an aqueous alkaline medium according to the method of copending application Serial No. 588,988, filed June 4, 1956, now abandoned. The reaction has been successful on a small scale only, however, because its highly exothermic character, coupled with a high rate of reaction, has made it difficult to control in commercial plant scale operations.

An object of the present invention is the provision of a process for epoxidizing alpha,beta-ethylenic aldehydes which avoids the limitations of the previous methods. Another object is the improvement of the known method of reacting alpha,beta-ethylenic aldehydes with hydrogen peroxide under alkaline conditions so the reaction can be carried out successfully on a large scale. Still another object is to provide a practical continuous process for producing alpha,beta-epoxyaldehydes economically and efficiently by reacting the corresponding ethylenic aldehydes with aqueous hydrogen peroxide. A more particular object is the provision of a process whereby the reaction of alpha,beta-ethylenic aldehydes with alkaline hydrogen peroxide can be controlled effectively on a large scale and undesirable by-product formation minimized. Still other objects and advantages of the new process will be apparent from the following description of the invention.

It has been found that the foregoing objects can be attained by the improvement in the epoxidation of alpha,-beta-ethylenic aldehydes with hydrogen peroxide which comprises carrying out this reaction in a plurality of reaction stages through which an aqueous reaction mixture is passed in series and separately feeding basic agent to each of the reaction zones. In an especially advantageous modification of the new process an aqueous stream comprising the starting alpha,beta-ethylenic aldehyde and hydrogen peroxide is passed continuously through a reaction zone while basic agent is added thereto at a plurality of points along the path of flow of the mixture. In a further modification of the process of the invention, the alpha,beta-ethylenic aldehyde is admixed with aqueous hydrogen peroxide before addition of base thereto and the mixture is passed through a plurality of reaction zones into each of which base is separately introduced. In a still further, especially advantageous modification of the invention, the feed mixture of alpha,beta-ethylenic aldehyde and hydrogen peroxide is admixed with a portion of the reacted mixture and then introduced into the first of a series of reaction zones into each of which base is separately fed.

By operating in accordance with the invention, the exothermic heat of reaction can be effectively controlled in an economical manner on any scale of production required. Not only can high yields of alpha,beta-epoxyaldehydes be obtained, but also high conversions of both hydrogen peroxide and ethylenic aldehyde can be achieved at the same time.

The process can be carried out successfully with any aldehyde having an ethylenic group directly linked to the aldehyde carbonyl carbon atom of the molecule. Representative examples of suitable starting alpha,beta-ethylenic aldehydes are, for instance, aliphatic aldehydes such as acrolein, methacrolein, crotonaldehyde, tiglicaldehyde, alpha- or beta-ethyl acrolein, beta-methyl crotonaldehyde, alpha,beta-dimethyl crotonaldehyde, 2-hexenal, 2-octenal, 2-decenal, and the like; cycloaliphatic aldehydes as 1-cyclopentane-1-carboxaldehyde, 1-cyclohexene-1-carboxaldehyde, 2-methyl-1-cyclohexene-1-carboxaldehyde, 2,6,-6-trimethyl-1-cyclohexene-1-carboxaldehyde, etc.; aromatic aldehydes of which cinnamaldehyde, delta-1(2),alpha-naphthalene-acetaldehyde, 1-naphthaleneacrylaldehyde, 9-phenanthrenecrotonaldehyde, and the like, are typical. Instead of monoethylenic aldehydes, those which have a plurality of ethylenic groups in the molecule can be used, the reaction being selective at the alpha,beta-ethylenic double bond. Thus, 2,4-pentadienal gives 2,3-epoxy-4-pentenal, citral yields 2,3-epoxy-3,7-dimethyl-6-octenal, 1,3-cyclohexadiene-1-carboxaldehyde gives 1,2-epoxy-3-cyclohexene-1-carboxaldehyde and paravinylcinnamaldehyde gives 3-(paravinylphenyl)-2,3-epoxypropionaldehyde. Polyaldehydes having one or more ethylenic groups in alpha,beta-position with respect to carboxyl, as for example, glutaconaldehyde, 2-hexenedial and 2-decenedial are other examples of suitable starting compounds, those having a plurality of ethylenic groups, alpha,beta- to carbonyl giving polyepoxy products. Thus, 2,3,6,7-diepoxy-octanedial is obtained from 2,6-octadiendial, for instance. The preferred starting alpha,beta-ethylenic aldehydes are those having 3 to 10 carbon atoms per molcule, especially those containing only carbon, hydrogen and carbonyl oxygen atoms in the molecule. However, the reaction can be successfully carried out with alpha,beta-ethylenic aldehydes containing substituents which are non-reactive under the reaction conditions. Such substituents include, for example, halogen atoms as in alpha-chloroacrolein, for instance, and hydroxyl, carbonyl, ether and like groups as exemplified by beta-hydroxymethylacrolein, beta-acetylacrolein and beta-methoxyacrolein. The process is of special value for the epoxidation of alpha-methylidene aldehydes which are particularly difficult to epoxidize.

The process is carried out with the reactants in liquid phase in an aqueous medium. In the case of starting alpha,beta-ethylenic aldehydes which do not have sufficient solubility in water under the reaction conditions, a suitable water-miscible organic solvent for the aldehyde can be used in forming the aqueous reaction medium. Suitable solvents include, for instance, alcohols such as tertiarybutyl alcohol for example, and ketones such as acetone, methyl ethyl ketone and the like.

As previously indicated, the reaction is carried out at a pH in the range of about 6.5 to about 10.5. Any suitable basic agent can be used to maintain the required pH control. Basic agents which are soluble in the reaction mixture are especially advantageous. Because of their ready availability at a low cost, basic inorganic compounds are generally preferred. Suitable bases of this kind are, for example, the inorganic hydroxides, particularly the alkali metal and alkaline earth metal hydroxides such as sodium, potassium, ammonium, calcium and magnesium hydroxides, etc. The corresponding oxides or basic salts can also be used. Thus, calcium or magnesium oxides or water soluble carbonates, bicarbonates, phosphates and the like, for instance, sodium carbonate or bicarbonate, mono-, di- or tri-sodium or potassium phosphate, etc., are suitable. Organic bases which can be used, although they are generally less preferred because of their higher cost, are, for example, amines such as the mono-, di- or tri-alkyl amines or quaternary ammonium bases of which the methyl, ethyl and isopropyl amines and quaternary ammonium bases are representative.

The conditions of reaction under which the new process can be successfully carried out will vary depending upon the particular alpha,beta-ethylenic aldehyde which is to be epoxidized. In general, it is desirable to have a slight excess of hydrogen peroxide over the stoichiometric requirement for reaction with the alpha,beta-ethylenic aldehyde since these aldehydes tend to polymerize in the absence of hydrogen peroxide under the basic conditions used in the reaction. A pH of about 6.5 but not higher than about 10.5 is preferably maintained in the reaction mixture during the reaction, more preferably a pH of about 7.5 to about 9.0 being used. The following feed ratios, expressed in moles, have been found to be generally suitable:

$H_2O_2$ to alpha,beta-ethylenic aldehyde ca. 1:1 to ca. 1.2:1, preferably ca. 1.01:1 to 1.05:1.
Base to alpha,beta-ethylenic aldehyde ca. 0.02 to ca. 0.2:1, preferably ca. 0.05:1 to ca. 0.1:1.
Solvent to alpha,beta-ethylenic aldehyde ca. 5:1 to ca. 70:1, preferably ca. 20:1 to ca. 30:1.

The temperature is preferably maintained below about 80° C. in the reaction and more advantageously an average reaction temperature of about 35° to about 80° C.; most preferably about 50° to about 60° C. is employed. As previously indicated, the reaction is unusually rapid and since extended times of exposure of the product to elevated temperatures tends to reduce the yield, it is generally desirable to limit the time at which the reaction mixture is at reaction temperature to less than about 30 minutes. Advantageously total times of the order of about 10 sec. to 5 minutes are used for the reaction.

The number of reaction stages which it will be most desirable to employ can be varied depending upon the particular ethylenic aldehyde being epoxidized and the efficiency of heat transfer in the reactor which is chosen for carrying out the process. At least two reaction stages are necessary, i.e., there should be at least two separate points of addition of basic agent to the reaction mixture and more generally at least three such reaction stages are preferred. There is usually little advantage in using more than about 5 stages of reaction. Most advantageously the process is carried out with a residence time of about 1 second to about 3 minutes in each of the reaction stages which are preferably controlled so that the maximum temperature rise in the reaction is about 5° to about 20° C. while maintaining an average reaction temperature in the range of about 50° to 60° C. The time of residence of the reaction mixture in each of the reaction zones need not be the same, nor need the amounts of base which are added to the various reaction zones be the same in all cases. Thus, under some circumstances it may be desirable to introduce less base in the first reaction zone where the temperature rise is usually greatest than in later reaction zones of the series.

The process can be carried out in apparatus of various types. One system which is especially advantageous is illustrated diagrammatically in the accompanying drawing which is not to scale. In the drawing three reaction stages, 1, 2 and 3, are shown. Each reaction stage is provided with a reaction coil, 4, 5 and 6, whereby the reaction mixture is maintained in indirect heat transfer relationship with a cooling medium. Aqueous hydrogen peroxide from a source not shown is fed to the system by line 7 into which the alpha,beta-ethylenic aldehyde to be epoxidized is introduced by line 8, together with an organic solvent, if required. Basic agent, preferably in aqueous solution, is supplied by lines 9 and 10 by the mixture before it enters reaction coil 4 of the first reaction stage to which cooling medium from line 11 is fed by line 12 and withdrawn by line 13. After reaction in the first reaction stage the partially reacted mixture is passed by line 14 to reaction stage 2 after addition of base from lines 15 and 10. The mixture with added base is further reacted in coil 5 while being cooled by cooling medium supplied by lines 11 and 16 and removed by line 17. Reacted mixture from unit 2 is passed by line 18 to reaction coil 6 of the final reaction stage after addition by line 19 of further base from line 10. In the final reaction stage 3 the reaction mixture is cooled by cooling medium introduced by line 20 from supply line 11, and withdrawn by line 21. The reacted mixture containing the alpha,beta-epoxyaldehyde product is taken off by line 22 feeding to storage tank 23 from which it is withdrawn by line 24 for recovery and/or purification as required.

In the system shown in the drawing, provision is made for operation according to an especially useful modification in which a portion of the reacted mixture is taken off from line 24 by line 25 feeding to pump 26 from which it is returned by line 27 to mix with the feed in line 7 going to the first reaction stage. This method of operation has the advantage that the temperature rise in the reaction is reduced as a result of the dilution of the feed with recycled reacted mixture.

Thus the adiabatic temperature rise in reaction of 1 mole of acrolein with 1.05 moles of hydrogen peroxide in the presence of 22 moles of water and 0.08 mole of sodium hydroxide, for example, is 110° C. Recycle of 1 volume of reacted mixture per volume of feed automatically lowers this maximum rise to 55° C. Surprisingly, the yield is not reduced as would have been expected from the results of batch experiments in which the feed is added to stirred reaction mixture. Such batch reaction with infinite back-mixing of product with the feed results in very poor yields of the order of 50 to 65% in epoxidizing acrolein. In contrast, with staged reaction and recycling of reacted mixture according to the invention yields of 80 to 85% were obtained under the same conditions. Recycle of about 0.5 to about 3 volumes of reacted mixture per volume of feed is advantageous, more preferably about 1 to about 2 volumes of recycle being employed.

When epoxidizing alpha-methylidine alkanols such as acrolein and methacrolein which are especially prone to polymerize under basic conditions, it is generally desirable to premix the alpha,beta-ethylenic aldehyde with the hydrogen peroxide before introducing the reaction mixture into the first reaction zone as shown in drawing. Otherwise there is a tendency for fouling to take place at the aldehyde inlet port which may plug up in this way so that interruptions of operation are frequent. With alpha,beta-ethylenic aldehydes such as crotonaldehyde, cinnamylaldehyde, etc., which are less subject to polymerization under the reaction conditions, other methods of introducing the reactants can be satisfactorily employed.

The invention is further illustrated by the following non-limitative examples:

*Example 1*

In a three stage reaction unit comprising a stainless steel reaction tube in a water cooling bath and having three inlets for injection of caustic soda solution uniformly spaced along the coil, acrolein premixed with hydrogen peroxide was epoxidized under the following conditions:

Feed mole ratios:
    Hydrogen peroxide to acrolein _____ 1.05:1
    Water to acrolein _____ 15:1
    Sodium hydroxide (total) to acrolein ____ 0.077:1

Temperature:
  Water bath _____ °C__ 50
  Reaction mixture, maximum _____ °C__ 60
pH of effluent _____ 8.3
Residence time _____ sec__ 20
Recycled product to feed, volume ratio _____ 1:1

Under these conditions the hydrogen peroxide conversion was 95.1% of the acrolein feed and the yield of crude epoxide which was found by analysis to contain 93.0% by weight of glycidaldehyde and 4.9% glycidic acid was 87.7% based on the hydrogen peroxide consumed.

Equally good results were obtained with a total residence time of 3 minutes at 55° C. using 1 minute residence between caustic injections.

The small temperature rise in these operations is to be contrasted with the theoretical rise obtainable using a feed of 1.05 moles of hydrogen peroxide, 22 moles of water and 0.08 mole sodium hydroxide per mole of acrolein where the heat of reaction gives an adiabatic temperature rise of 110° C.

*Example II*

Three stage epoxidation of acrolein with injection of equal amounts of caustic in each stage, as in Example I, was carried out in the same reactor without recycle of reacted product. The reaction conditions were as follows:

Feed mole ratios:
  Hydrogen peroxide to acrolein _____ 1.069:1
  Water to acrolein _____ 23:1
  Sodium hydroxide to acrolein _____ 0.082:1
Temperature:
  Water bath _____ °C__ 30
  Reaction mixture, maximum _____ °C__ 50
pH of effluent _____ 9.0
Residence time _____ seconds__ 20

The hydrogen peroxide conversion under these conditions was 95.3% based on the acrolein fed and the yield of crude epoxide was 84.5% based on the acrolein fed and 88.7% based on the hydrogen peroxide consumed.

Equally good results are obtained using sodium bicarbonate as the base instead of sodium hydroxide in this method of reaction.

*Example III*

The effect of operating with and without product recycle when epoxidizing acrolein in the three stage continuous coil reactor of Example I was compared in tests carried out under the following conditions:

Feed mole ratios:
  Hydrogen peroxide to acrolein _____ 1.094:1
  Water to acrolein _____ 23.1
  Sodium hydroxide to acrolein _____ 0.082:1
Residence time _____ seconds__ 20

The following results were obtained:

| Product to Feed Recycle Volume Ratio | Bath Temperature, °C. | Effluent pH | Temperature Rise, °C. | Crude Epoxide Yield Mole Percent of Acrolein Fed |
|---|---|---|---|---|
| none | 50 | 8.0 | 19 | 84.9 |
| 1:1 | 50 | 8.7 | 8 | 85.7 |
| 2:1 | 50 | 8.7 | 6 | 85.5 |
| none | 70 | 6.4 | 26 | 72.9 |
| 1:1 | 70 | 7.2 | 8 | 83.6 |

The higher effluent pH when employing product recycle according to the invention indicates lower formation of acidic by-products in the process which simplifies product recovery and purification.

We claim as our invention:

1. In a process for producing an epoxyaldehyde by reacting an alpha,beta-ethylenic aldehyde with hydrogen peroxide, the improvement which comprises carrying out the reaction in a plurality of reaction zones in series and separately adding base to the reaction mixture in each of said zones to maintain the pH of the mixture in the range of about 6.5 to about 10.5, the temperature in each of said zones being maintained at a temperature of from about 35° C. to about 80° C.

2. A process in accordance with claim 1 wherein the ethylenic aldehyde is mixed with an excess of aqueous hydrogen peroxide and the mixture is passed through a plurality of reaction zones into each of which is continuously introduced an aqueous solution of said base.

3. A process for producing an epoxyldehyde by reacting an alpha,beta-ethylenic aldehyde with hydrogen peroxide which comprises adding a base at a plurality of points along the path of flow of an aqueous mixture of said reactants under reaction conditions to maintain the pH of the mixture in the range of about 6.5 to about 10.5, the temperature at all points along the path of flow of the reaction mixture being maintained at a temperature of from about 35° C. to about 80° C.

4. A process in accordance with claim 3 wherein said points of separate introduction of base are spaced along the path of flow so that the residence time of the reaction mixture therebetween is not greater than about 3 minutes.

5. A process which comprises flowing an aqueous mixture comprising alpha-beta-ethylenic aldehyde and hydrogen peroxide in heat transfer relationship with a cooling medium and adding base sufficient to maintain the pH at about 6.5 to about 10.5 at a plurality of points along the path of flow of the reaction mixture spaced so that said cooling medium absorbs sufficient of the heat evolved on said addition of base that the temperature rise in the mixture is not greater than about 20° C. while maintaining an average reaction temperature in the range of about 50° to 60° C.

6. A process for producing an epoxyaldehyde which comprises reacting an alpha,beta-ethylenic aldehyde with aqueous hydrogen peroxide at a pH of about 6.5 to about 10.5 in a plurality of reaction zones in series while separately adding base to the reaction mixture in each of said zones, and returning a portion of the reacted mixture to admix with the feed to the reaction system, the temperature in each of said zones being maintained at a temperature of from about 35° C. to about 80° C.

7. A process in accordance with claim 6 wherein alpha,beta-ethylenic aldehyde is admixed with an excess of hydrogen peroxide before being contacted with said added base.

8. A process in accordance with claim 7 wherein the aldehyde is an alpha-methylidine alkanal having three to eight carbon atoms per molecule.

9. A process in accordance with claim 8 wherein the aldehyde is acrolein.

10. A process is accordance with claim 7 wherein the aldehyde is crotonaldehyde.

References Cited in the file of this patent

FOREIGN PATENTS 509,938    Germany _____ Oct. 14, 1930

OTHER REFERENCES

Weitz, Berichte, vol. 54, pp. 2327–44 (1921).